United States Patent
Mills, Jr. et al.

(10) Patent No.: US 12,136,221 B2
(45) Date of Patent: *Nov. 5, 2024

(54) IMAGE EVALUATION AND DYNAMIC CROPPING SYSTEM

(71) Applicant: Bank of America Corporation, Charlotte, NC (US)

(72) Inventors: Robert E. Mills, Jr., Stockbridge, GA (US); Murali Santhanam, Naperville, IL (US); Kerry Kurt Simpkins, Fort Mill, SC (US); John B. Hall, Charlotte, NC (US); Michael J. Pepe, Jr., Wilmington, DE (US); Jasher David Fowles, Davidson, NC (US); Jeanne Moulton, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,776

(22) Filed: Jul. 25, 2023

(65) Prior Publication Data
US 2023/0368391 A1 Nov. 16, 2023

Related U.S. Application Data

(63) Continuation of application No. 17/538,081, filed on Nov. 30, 2021, now Pat. No. 11,763,458, which is a
(Continued)

(51) Int. Cl.
*G06T 7/60* (2017.01)
*G06T 3/4023* (2024.01)
(Continued)

(52) U.S. Cl.
CPC ............. *G06T 7/11* (2017.01); *G06T 3/4023* (2013.01); *G06T 7/0002* (2013.01); *G06T 7/50* (2017.01);
(Continued)

(58) Field of Classification Search
CPC ....... G06T 3/4023; G06T 7/11; G06T 7/0002; G06T 7/60; G06T 7/50; G06K 9/6202; G06K 9/32
See application file for complete search history.

(56) References Cited

U.S. PATENT DOCUMENTS

| 5,815,592 | A | 9/1998 | Mennie et al. |
| 5,901,253 | A | 5/1999 | Tretter |

(Continued)

OTHER PUBLICATIONS

Apr. 17, 2020—(US) Non-Final Office Action—U.S. Appl. No. 16/157,276.
(Continued)

*Primary Examiner* — Sam Bhattacharya
(74) *Attorney, Agent, or Firm* — Banner & Witcoff, Ltd.

(57) ABSTRACT

Systems for image evaluation and dynamic cropping are provided. In some examples, a system, may receive an instrument or image of an instrument. Identifying information may be extracted from the instrument or image of the instrument. Based on the extracted identifying information, a check/check image profile may be retrieved. In some examples, expected size and/or shape data may be extracted from the check/check image profile. The extracted expected size and/or shape data may be compared to size and/or shape data from the received instrument or image of the instrument to identify any anomalies (e.g., to determine whether the expected size and/or shape data matches the size and/or shape data of the received instrument or image of the instrument. If the expected size and/or shape data does not match size and/or shape data from the received instrument or image of the instrument, the instrument or image of the instrument may be programmatically modified and a modified image of the instrument may be generated.

21 Claims, 10 Drawing Sheets

Related U.S. Application Data continuation of application No. 17/032,458, filed on Sep. 25, 2020, now Pat. No. 11,256,944, which is a continuation of application No. 16/157,326, filed on Oct. 11, 2018, now Pat. No. 10,839,243.

(51) Int. Cl.
| | | |
|---|---|---|
| *G06T 7/00* | (2017.01) | |
| *G06T 7/11* | (2017.01) | |
| *G06T 7/50* | (2017.01) | |
| *G06V 10/25* | (2022.01) | |
| *G06V 30/418* | (2022.01) | |

(52) U.S. Cl.
CPC ............... *G06T 7/60* (2013.01); *G06V 10/25* (2022.01); *G06V 30/418* (2022.01); *G06T 2210/22* (2013.01)

(56) References Cited

U.S. PATENT DOCUMENTS

| | | | |
|---|---|---|---|
| 6,026,189 | A | 2/2000 | Greenspan |
| 6,430,320 | B1 | 8/2002 | Jia et al. |
| 7,920,714 | B2 | 4/2011 | O'Neil |
| 8,155,425 | B1 | 4/2012 | Mandel |
| 8,417,017 | B1 | 4/2013 | Beutel et al. |
| 8,824,772 | B2 | 9/2014 | Viera et al. |
| 9,129,340 | B1 | 9/2015 | Medina, III et al. |
| 9,218,701 | B2 | 12/2015 | Cantley et al. |
| 9,652,690 | B2 | 5/2017 | Eid et al. |
| 9,843,731 | B2 | 12/2017 | Shimosato |
| 10,242,283 | B1 | 3/2019 | Jain et al. |
| 10,423,938 | B1 | 9/2019 | Gaeta et al. |
| 2002/0146170 | A1 | 10/2002 | Rom |
| 2004/0247168 | A1 | 12/2004 | Pintsov et al. |
| 2005/0243378 | A1 | 11/2005 | Klein et al. |
| 2006/0202012 | A1 | 9/2006 | Grano et al. |
| 2006/0255124 | A1 | 11/2006 | Hoch et al. |
| 2007/0136198 | A1 | 6/2007 | Foth et al. |
| 2008/0025555 | A1 | 1/2008 | Visan et al. |
| 2012/0170829 | A1 | 7/2012 | Jackson et al. |
| 2012/0177281 | A1 | 7/2012 | Frew |
| 2014/0112571 | A1 | 4/2014 | Viera et al. |
| 2014/0184848 | A1 | 7/2014 | Shimosato |
| 2014/0355865 | A1 | 12/2014 | Cantley et al. |
| 2015/0139492 | A1 | 5/2015 | Murakami et al. |
| 2015/0161765 | A1* | 6/2015 | Kota .................. G06T 3/40 382/137 |
| 2015/0186753 | A1 | 7/2015 | Horita |
| 2015/0379341 | A1 | 12/2015 | Agrawal et al. |
| 2016/0085564 | A1 | 3/2016 | Arcese et al. |
| 2016/0253573 | A1 | 9/2016 | Eid et al. |
| 2017/0011404 | A1 | 1/2017 | Clower et al. |
| 2017/0052944 | A1 | 2/2017 | Choudhry et al. |
| 2017/0249061 | A1 | 8/2017 | Popescu et al. |
| 2018/0096340 | A1 | 4/2018 | Omojola et al. |

OTHER PUBLICATIONS

May 29, 2020—(US) Non-Final Office Action—U.S. Appl. No. 16/157,384.
Jun. 1, 2020—(US) Notice of Allowance—U.S. Appl. No. 16/157,473.
Jun. 19, 2020—(US) Notice of Allowance—U.S. Appl. No. 16/212,043.
Jun. 4, 2020—(US) Non-Final Office Action—U.S. Appl. No. 16/211,963.
Aug. 6, 2020—(US) Notice of Allowance—U.S. Appl. No. 16/157,276.
Sep. 11, 2020—(US) Notice of Allowance—U.S. Appl. No. 16/157,384.
Sep. 16, 2020—(US) Notice of Allowance—U.S. Appl. No. 16/212,043.
Sep. 11, 2020—(US) Notice of Allowance—U.S. Appl. No. 16/211,963.
Oct. 27, 2020—(US) Notice of Allowance—U.S. Appl. No. 16/157,473.
Aug. 13, 2021—(US) Non-Final Office Action—U.S. Appl. No. 17/061,738.
Mar. 1, 2022—(US) Non-Final Office Action—U.S. Appl. No. 17/032,243.
Jun. 9, 2022—(US) Notice of Allowance—U.S. Appl. No. 17/108,401.
Oct. 20, 2021—(US) Notice of Allowance—U.S. Appl. No. 17/061,738.
Sep. 21, 2022—(US) Notice of Allowance—U.S. Appl. No. 17/064,054.

* cited by examiner

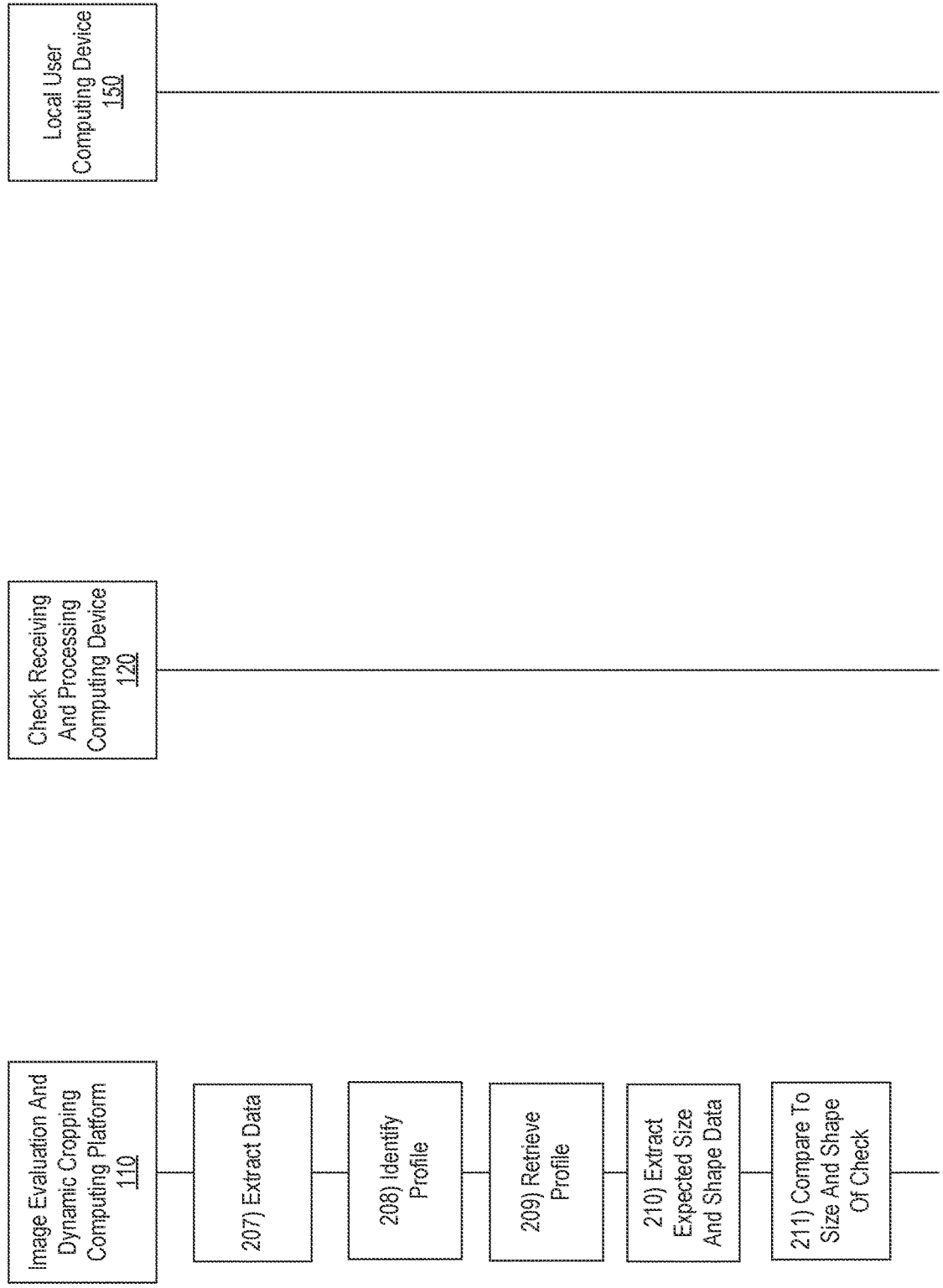

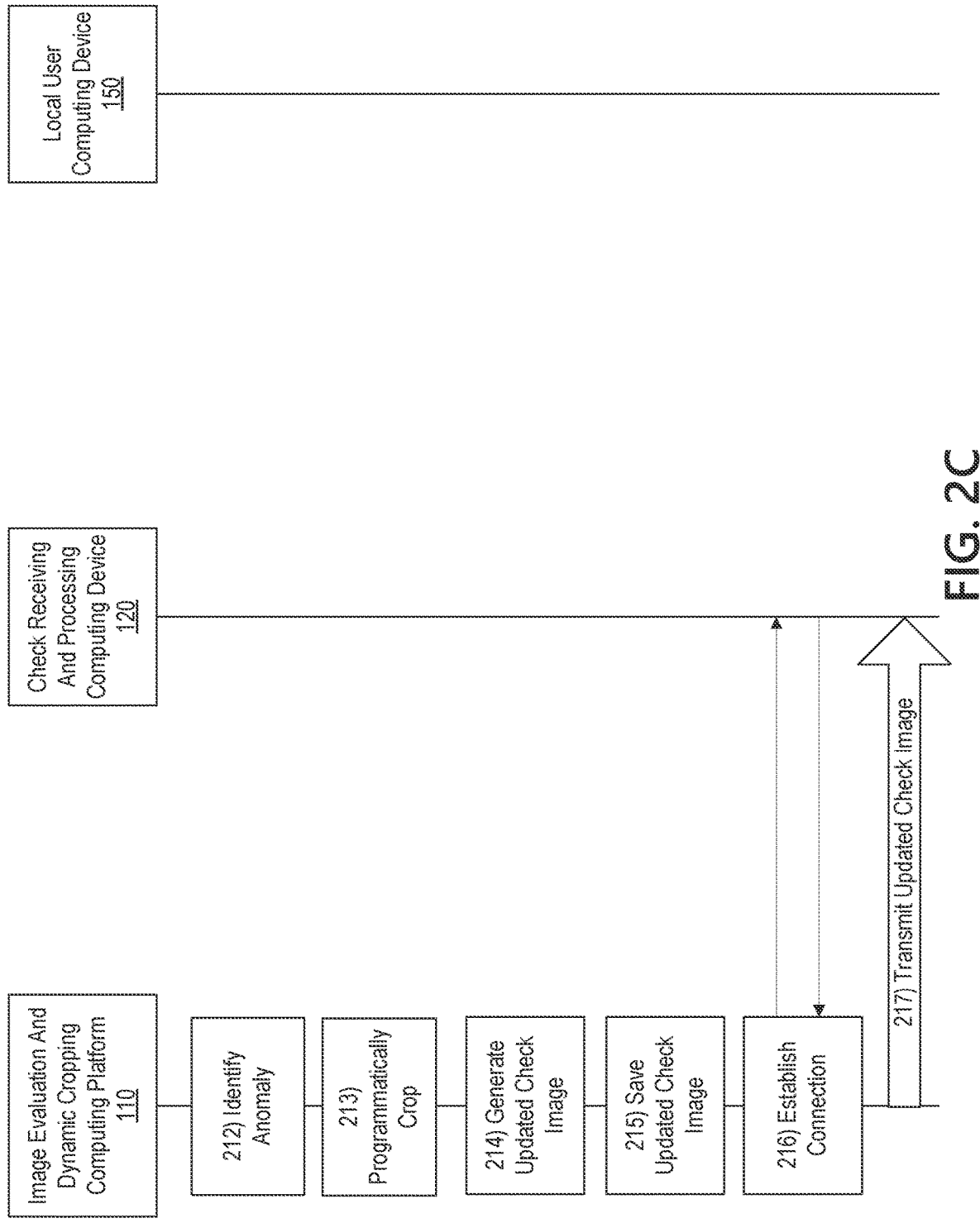

IMAGE EVALUATION AND DYNAMIC CROPPING SYSTEM

CROSS REFERENCE TO RELATED APPLICATIONS

This application is a continuation of and claims priority to co-pending U.S. application Ser. No. 17/538,081, filed Nov. 30, 2021, and entitled "Image Evaluation and Dynamic Cropping System," which is a continuation of and claims priority to U.S. application Ser. No. 17/032,458, filed Sep. 25, 2020, and entitled "Image Evaluation and Dynamic Cropping System," which is a continuation of and claims priority to U.S. application Ser. No. 16/157,326 filed Oct. 11, 2018, and entitled "Image Evaluation and Dynamic Cropping System," all of which are incorporated herein by reference in their entirety.

This application is related to U.S. application Ser. No. 16/157,276 filed Oct. 11, 2018, and entitled, "Item Validation and Image Evaluation System," U.S. application Ser. No. 16/157,384 filed Oct. 11, 2018, and entitled, "Enterprise Profile Management and Control System," and U.S. application Ser. No. 16/157,473 filed Oct. 11, 2018, and entitled, "Dynamic Profile Control System." All of which are incorporated herein by reference in their entirety.

BACKGROUND

Aspects of the disclosure relate to electrical computers, systems, and machine learning. In particular, one or more aspects of the disclosure relate to image evaluation and dynamic cropping of images and image data.

Thwarting unauthorized activity on one or more accounts is an important function. As unauthorized actors become more sophisticated, it can be difficult to identify unauthorized instruments. Further, even systems configured to identify unauthorized instruments can identify false positives. In some examples, a physical condition of an instrument can impact the accuracy of any validity analysis of the instrument. Accordingly, it would be advantageous to modify documents or images of documents to provide a uniform size and/or shape of the document or image of the document for analysis.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

In some examples, a system, computing platform, or the like, may receive an instrument or image of an instrument. In some examples, the instrument may have been previously evaluated or processed to determine or attempt to determine validity and/or authenticity.

The instrument or image of the instrument may be received and identifying information may be extracted from the instrument or image of the instrument. Based on the extracted identifying information, a check/check image or other document profile may be retrieved. In some examples, expected size and/or shape data may be extracted from the check/check image profile. The extracted expected size and/or shape data may be compared to size and/or shape data from the received instrument or image of the instrument to identify any anomalies (e.g., to determine whether the expected size and/or shape data matches the size and/or shape data of the received instrument or image of the instrument.

In some examples, if the expected size and/or shape data does not match size and/or shape data from the received instrument or image of the instrument, the instrument or image of the instrument may be programmatically modified and a modified image of the instrument may be generated. In some examples, the modified image of the instrument may then be further processed to determine validity and/or authenticity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing image evaluation and dynamic cropping functions in accordance with one or more aspects described herein;

FIGS. 4A and 4B illustrate example instruments that may be evaluating and dynamically cropped in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to image evaluation and dynamic cropping of instruments, documents, or images thereof.

As mentioned above, protecting user data and thwarting unauthorized activity is a priority for most users. In some examples, unauthorized actors may generate unauthorized or invalid checks or other instruments. Accordingly, in some examples, systems may evaluate the checks or other instruments or documents to determine validity and/or authenticity of the checks, instruments or other documents. However, in some examples, a physical condition of the check, instrument or other document can impact the accuracy of the analysis. For instance, checks that are provided to a user as part of a tear away arrangement (e.g., the check portion is removed from another portion of the document along, for example, one or more perforations) may have uneven edges causing irregular size and shape issues for the check and analysis of the check.

Accordingly, aspects described herein are directed to systems for evaluating a size and/or shape of an instrument, check, or other document to ensure it matches an expected size and/or shape. If one or more anomalies are detected, the check, instrument or other document, or image thereof, may be modified, cropped, edited or the like to conform the check, instrument or other document to an expected size and/or shape (or closer to an expected size and/or shape). An updated or modified check, instrument or other document, or image thereof, may then be generated and further process for validity and/or authenticity.

These and various other arrangements will be discussed more fully below.

Figure 1A:
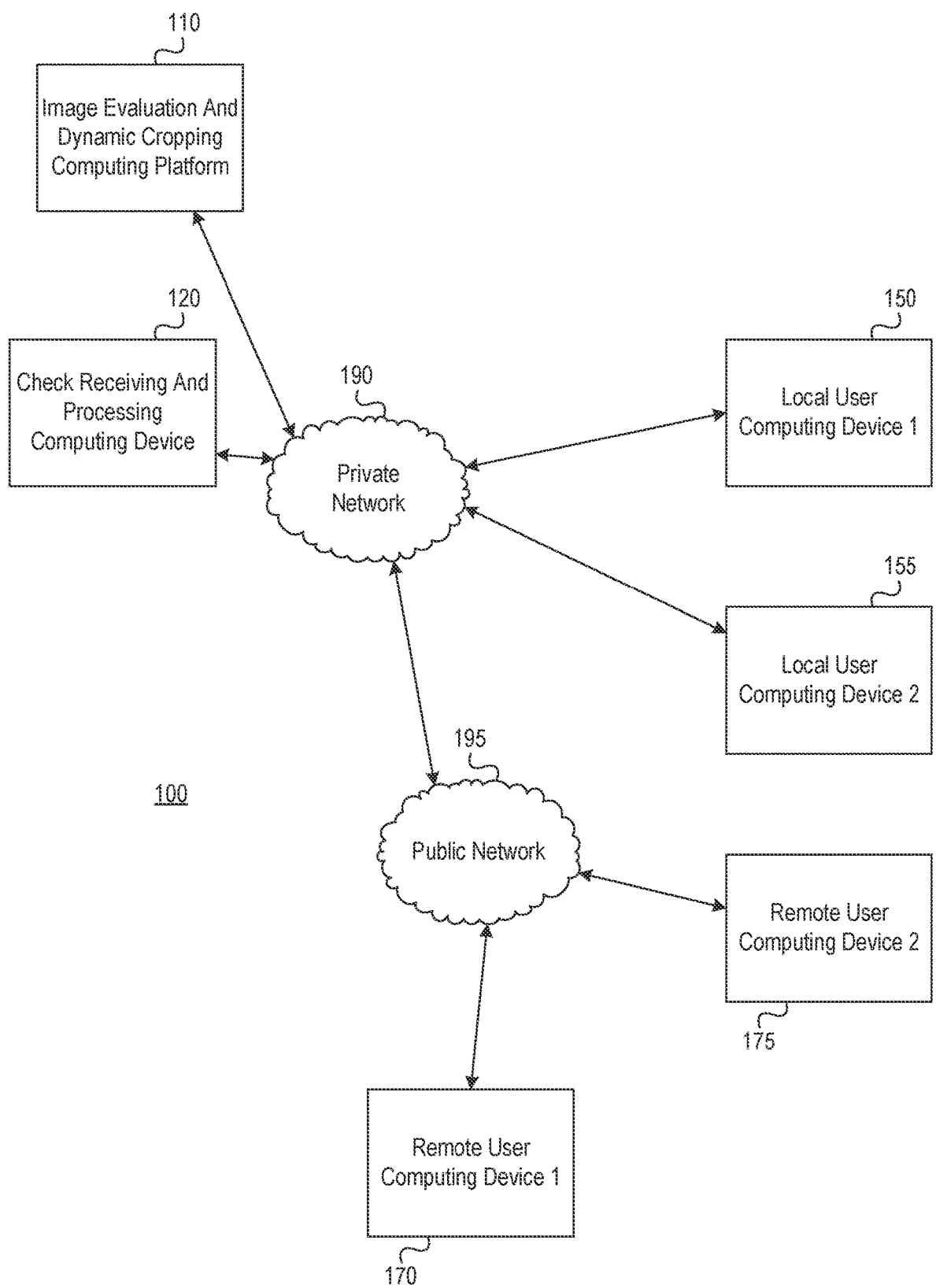
FIGS. 1A and 1B depict an illustrative computing environment for implementing image evaluation and dynamic cropping functions in accordance with one or more aspects described herein.
Figure 1B:
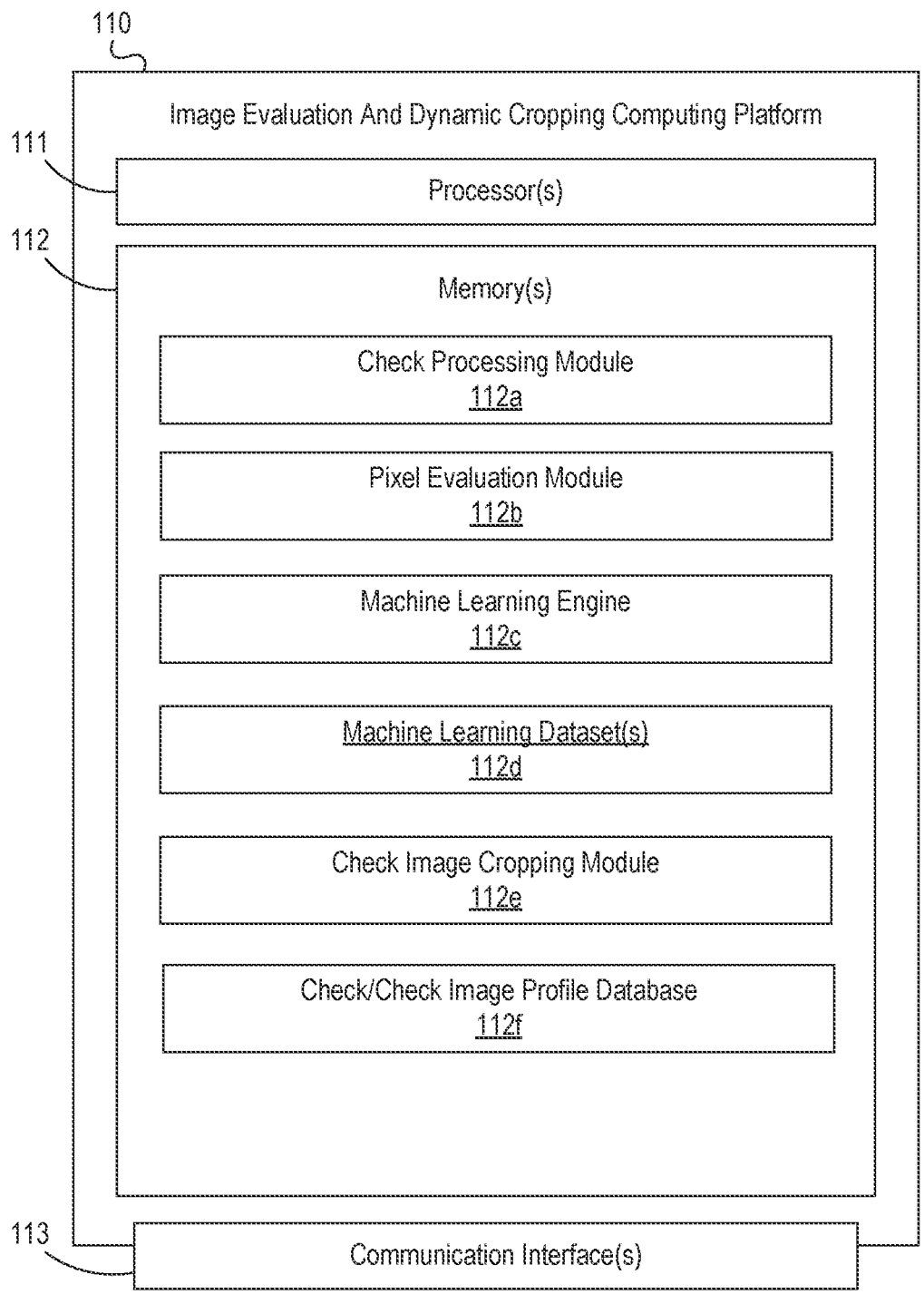

FIGS. 1A and 1B depict an illustrative computing environment for implementing and using a system for image evaluation and dynamic cropping in accordance with one or more aspects described herein. Referring to FIG. 1A, computing environment 100 may include one or more computing devices and/or other computing systems. For example, computing environment 100 may include an image evaluation and dynamic cropping computing platform 110, a check receiving and processing computing device 120, a first local user computing device 150, a second local user computing device 155, a first remote user computing device 170, and a second remote user computing device 175.

Image evaluation and dynamic cropping computing platform 110 may be configured to host and/or execute a machine learning engine to provide intelligent, dynamic image evaluation and cropping functions with respect to checks or other instruments or documents that are being evaluated as potentially fraudulent or otherwise unauthorized or have been identified as fraudulent or otherwise unauthorized. For instance, check receiving and processing computing device 120 may include one or more computing devices, servers, or the like, configured to receive checks or other instruments from a variety of sources. For instance, checks may be received via online or mobile banking applications executing on a user computing device, such as remote user computing device 170, 175, from an automated teller machine (ATM) or other self-service kiosk, from a banking associated within a financial institution location, or the like.

In some examples, the checks may be received by the check receiving and processing computing device 120 and may be processed, in real-time or near real-time, to evaluate the validity of the check or other instrument. In some examples, processing the check or other instrument may include comparing the check to one or more checks in a user profile associated with users drafting the checks (e.g., account holder, payer, or the like) and generating a score representing a likelihood that the check is fraudulent. For instance, the check receiving and processing computing device 120 may compare the received check to the plurality of checks in the user profile to evaluate various regions, fields or aspects of the check to determine whether the received check matches one or more checks in the user profile. Based on a number of matching items, a score may be determined. For instance, if several regions, fields, or the like, match, a low score may be generated indicating that there is a low likelihood that the check is fraudulent. If few or no items match, a high score may be generated indicating that it is very likely that the check is fraudulent.

In some examples, the check receiving and processing computing device 120 may convert the check to a digital image or may store a digital image of the check (e.g., if received via electronic systems such as online or mobile banking applications). In some examples, this check image data, as well as the generated score, may be transmitted to the image evaluation and dynamic cropping computing platform 110.

However, in some arrangements, checks having a non-standard size, physical anomaly, or the like (e.g., checks improperly opened or improperly detached from a portion of a mailing) may include uneven edges, tears or other anomalies in size that may make evaluation of the check or check image by the check receiving and processing computing device 120 difficult or impossible. For instance, anomalies in check size or shape may result in a false positive.

Accordingly, the image evaluation and dynamic cropping computing system 110 may evaluate checks or check images (e.g., prior to processing by the check receiving and processing computing device 120, or after a check or check image is processed by the check receiving and processing computing device to, for instance, determine whether an identified fraudulent check is actually fraudulent or a false positive) to determine whether a size and/or shape of the check or check images matches an expected size and/or shape.

For instance, the image evaluation and dynamic cropping computing platform 110 may receive the check or check image (e.g., from a remote user computing device 170, 175, from local user computing device 150, 155, from check receiving and processing computing device 120, or the like) and may perform an evaluation of the check or check image to determine whether a size and/or shape of the check or check image matches an expected size and/or shape. For instance, the image evaluation and dynamic cropping computing platform 110 may evaluate a check or check image to determine whether an overall size (e.g., number of pixels in an x direction, number of pixels in a y direction) matches expected values. In some examples, one or more portions of the check or check image may be evaluated in lieu of or in additional to evaluating an overall size of the check or check image.

If an anomaly is detected (e.g., if a size or shape does not match expected size or shape data) the system may identify an edge, portion or region of the check or check image that includes the anomaly and, in some examples, may programmatically crop the check image to generate an updated or modified check image having an expected size or shape or a size or shape within a predetermined threshold range of an expected size or shape. The updated or modified check image may be stored and/or may be evaluated (e.g., by check receiving and processing computing device 120) to determine whether the check associated with the updated or modified check image is valid and/or authentic.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the image evaluation and dynamic cropping computing platform 110 and/or the check receiving and processing computing device 120 to control parameters of the system, update rules, modify settings, and the like. Local user computing device 150, 155 may also include ATMs or other self-service kiosks, as well as banking associated computing devices, that may receive checks from a user and may transmit the check or check images for further processing.

The remote user computing devices 170, 175 may be used to communicate with, for example, image evaluation and dynamic cropping computing platform 110 and/or check receiving and processing computing device 120 to capture check image data, transmit check image data, and the like. For instance, remote user computing devices 170, 175 may include user computing devices, such as mobile devices including smartphones, tablets, laptop computers, and the like, that may be used to access and/or execute online banking applications, mobile banking applications, or the like.

In one or more arrangements, check receiving and processing computing device 120, local user computing device 150, local user computing device 155, remote user computing device 170, and/or remote user computing device 175 may be any type of computing device or combination of devices capable of performing the particular functions described herein. For example, check receiving and processing computing device 120, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of check receiving and processing computing device 120, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include image evaluation and dynamic cropping computing platform 110. As illustrated in greater detail below, image evaluation and dynamic cropping computing platform 110 may include one or more computing devices configured to perform one or more of the functions described herein. For example, image evaluation and dynamic cropping computing platform 110 may include one or more computers (e.g., laptop computers, desktop computers, servers, server blades, or the like).

As mentioned above, computing environment 100 also may include one or more networks, which may interconnect one or more of image evaluation and dynamic cropping computing platform 110, check receiving and processing computing device 120, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, image evaluation and dynamic cropping computing platform 110, check receiving and processing computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect image evaluation and dynamic cropping computing platform 110, check receiving and processing computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., image evaluation and dynamic cropping computing platform 110, check receiving and processing computing device 120, local user computing device 150, local user computing device 155) with one or more networks and/or computing devices that are not associated with the organization. For example, remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., image evaluation and dynamic cropping computing platform 110, check receiving and processing computing device 120, local user computing device 150, local user computing device 155).

Referring to FIG. 1B, image evaluation and dynamic cropping computing platform 110 may include one or more processors 111, memory 112, and communication interface 113. A data bus may interconnect processor(s) 111, memory 112, and communication interface 113. Communication interface 113 may be a network interface configured to support communication between image evaluation and dynamic cropping computing platform 110 and one or more networks (e.g., private network 190, public network 195, or the like). Memory 112 may include one or more program modules having instructions that when executed by processor(s) 111 cause image evaluation and dynamic cropping computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of image evaluation and dynamic cropping computing platform 110 and/or by different computing devices that may form and/or otherwise make up image evaluation and dynamic cropping computing platform 110.

For example, memory 112 may have, store, and/or include a check processing module 112a. Check processing module 112a may store instructions and/or data that may cause or enable the image evaluation and dynamic cropping computing platform 110 to receive one or more checks, check data, check image data, and the like, for further evaluation. In some examples, check processing module 112a may extract or parse data associated with the received check or data to identify a user or user profile or account associated with the payer of the check being evaluated. In some examples, data from the received check or check image may be used to identify a payer of a check. The identified payer may then be used to identify a check or check image profile associated with the payer and stored in, for example, check/check image profile database 112f. Check/check image profile database 112f may store checks and/or check images associated with a payer, as well as expected size and/or shape data associated with the payer. For instance, if the payer is a corporate entity that mails or otherwise distributes checks to users via a full page mailing with a check attached at a bottom portion via a perforation, the system may identify the payer and retrieve expected size and/or shape data for that payer based on known aspects of the mailer or other document generated with the check (e.g., size of full page mailer, height of check along full page, width of page, location of perforation, and the like).

Image evaluation and dynamic cropping computing platform 110 may further have, store and/or include a pixel evaluation module 112b. Pixel evaluation module 112b may store instructions and/or data that may cause or enable the image evaluation and dynamic cropping computing platform 110 to process received check data, images, and the like, to determine a size and/or shape of the check or check image being evaluated (e.g., number of pixels by number of pixels in one or more regions or location of the check or check image). The determined size and/or shape of the check or check image may be compared to expected size and/or shape data extracted from the check/check image (or other document) profile database 112f. If the size and/or shape of the check or check image match the expected size and/or shape data, the check may be transferred for further processing (e.g., for evaluation as valid and/or authentic, for further transaction processing, or the like). If the size and/or shape does not match expected size and/or shape data, the check or check image being evaluated may be flagged as having an anomaly and a check image cropping module 112e may evaluate the check or check image for programmatic cropping.

In some examples, identifying aspects of a payer's check (e.g., expected size and/or shape), evaluating a size and/or shape of the check or check image being evaluated, and the like, may be performed using machine learning. For instance, image evaluation and dynamic cropping computing platform 110 may further have, store and/or include a machine learning engine 112c and machine learning datasets 112d. Machine learning engine 112c and machine learning datasets 112d may store instructions and/or data that may cause or enable image evaluation and dynamic cropping computing platform 110 to evaluate received checks or check images as compared to one or more other checks from a payer to determine general aspects of payer checks, expected size and/or shape data, and the like. The machine learning datasets 112d may be generated based on analyzed data (e.g., data from previously received data, previously analyzed checks, and the like), raw data, and/or received from one or more outside sources.

The machine learning engine 112c may receive check images and/or data and, using one or more machine learning algorithms, may generate one or more machine learning datasets 112d. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112c may analyze data to identify patterns of activity, sequences of activity, and the like, to generate one or more machine learning datasets 112d.

In some examples, the machine learning datasets 112d may include machine learning data linking one or more payer check element characteristics to an expected size and/or shape. For instance, the machine learning datasets 112d may include machine learning data linking one or more aspects of a size of a payer mailer, and the like, to an expected size and/or shape of a check detached from the mailer. In some examples, the machine learning datasets 112d may be used to determine how to crop a check or check image. For instance, machine learning data may be used to identify the portion of the check or check image having the anomaly in size and/or shape and to determine where to programmatically crop the check, an amount of image data to remove in cropping (e.g., an area x pixels wide by y pixels long, or the like), particular pixels to delete (e.g., based on pixel coordinates), and the like. The machine learning datasets 112d may be updated and/or validated based on subsequent data received, for example, after a check has been evaluated, cropped, or the like.

Image evaluation and dynamic cropping computing platform 110 may further have, store and/or include a check image cropping module 112e. Check image cropping module 112e may have or include instructions and/or data that may cause or enable the image evaluation and dynamic cropping computing platform 110 to receive anomaly data in size and/or shape from the pixel evaluation module 112b and to identify one or more portions of the check or check image for programmatic cropping to generate an updated or modified check image having a standard or expected size and/or shape. For instance, the check image cropping module 112e may evaluate one or more edges of the check or check image to detect a position of the anomaly and may determine how much of the check or check image should be removed, where the cropping should occur and the like. The check image cropping module 112e may then generate an updated or modified check or check image by programmatically cropping the check or check image being evaluated. The updated or modified check or check image may have a size and/or shape matching (e.g., within a predetermined number of pixels or other units) or corresponding to expected size and/or shape data for checks associated with the payer.

The image evaluation and dynamic cropping computing platform 110 may further have, store and/or include check/check image profile database 112f. Check/check image profile database 112f may store check or other document profiles and associated information, such as name of a payer, account information, contact information, or the like. In some examples, the check/check image profiles may store one or more checks or check images associated with the user (e.g., payer) or user account that are identified as having an expected size and/or shape, measurements of the checks or check images having an expected size and/or shape for comparison, and the like. The checks or check images may correspond to a plurality of previously processed checks or other instruments that, in at least some examples, were determined to be valid.

FIGS. 2A-2D depict an illustrative event sequence for implementing and using image evaluation and dynamic cropping functions in accordance with one or more aspects described herein. The events shown in the illustrative event sequence are merely one example sequence and additional events may be added, or events may be omitted, without departing from the invention.

Figure 2A:
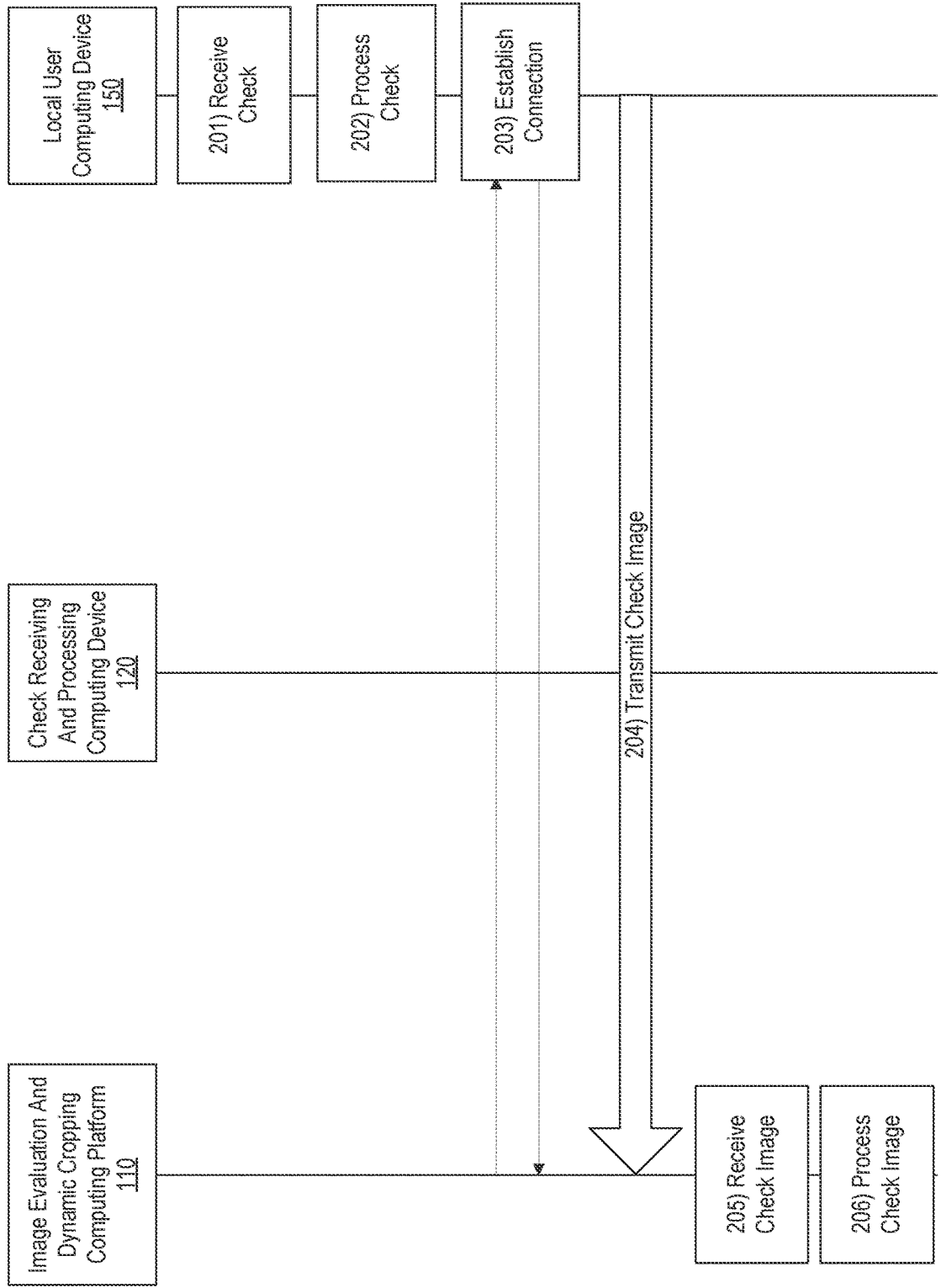

Referring to FIG. 2A, at step 201, a check may be received by a device. For instance, a check or other instrument may be received by local user computing device 150. As discussed herein, local user computing device 150 may include an ATM or other self-service kiosk, a banking associate computing device, or the like. Although the event sequence shown and described includes receiving a check by a local user computing device 150, in some examples, the check may be received by a remote user computing device 170 (e.g., via mobile or online banking applications) without departing from the invention.

At step 202, preliminary processing of the check may be performed. For instance, if the check may be converted to a digital image. Additionally or alternatively, the check image may be stored by the local user computing device 150, transmitted to another device for storage or the like.

At step 203, a connection may be established between the local user computing device 150 and the image evaluation and dynamic cropping computing platform 110. For instance, a first wireless connection may be established between the local user computing device 150 and the image evaluation and dynamic cropping computing platform 110. Upon establishing the first wireless connection, a communication session may be initiated between the image evaluation and dynamic cropping computing platform 110 and the local user computing device 150.

At step 204, the check or check image may be transmitted from the local user computing device 150 to the image evaluation and dynamic cropping computing platform 110. For instance, the check image may be transmitted during the communication session initiated upon establishing the first wireless connection.

In some examples, the check image may be transmitted to the check receiving and processing computing device 120 prior to transmission to the image evaluation and dynamic cropping computing platform 110. For instance, the check receiving and processing computing device 120 may receive the check, evaluate it for validity and may identify it as a potential false positive and forward the check image to the image evaluation and dynamic cropping computing platform 110 for evaluation and processing.

At step 205, the check image may be received by the image evaluation and dynamic cropping computing platform 110. Check or other document images may be received in any suitable document format, such as TIFF, PDF, or JPEG, or the like. At step 206, the check image may be processed. For instance, the check image may be processed to identify one or more data items in the check. In some examples, optical character recognition may be performed to identify data within one or more fields, elements, or the like, of the check or check image.

With reference to FIG. 2B, at step 207, data may be extracted from the check or check image. In some examples, the data may include a payer name, an account on which the check is drawn, other identifying information, or the like. At step 208, the extracted data may be used to identify a check or check image profile associated with the check or check image. For instance, the extracted data may be used as input to query a database storing one or more check or check image profiles. At step 209, the identified profile may be retrieved (e.g., based on the query).

At step 210, expected size and/or shape data may be extracted from the retrieved profile. For instance, a check/check image (or other document) profile may include dimensions, or the like, expected of a check associated with the profile. In some examples, the check image may include pixel coordinates corresponding to each pixel along each edge of a check or check image. The pixel coordinates may correspond to an expected edge of the check or check image. In another example, an overall length and/or width of the check may be extracted from the profile. In still other examples, a portion or region of the check or check image may be evaluated and size and/or shape data associated with the portion or region may be extracted.

At step 211, the expected size and/or shape data may be compared to size and/or shape data associated with the check image. For instance, the overall length and/or width may be determined and compared to extracted length and width data. In another example, pixel coordinates corresponding to each pixel of the check image along each edge of the check image may be determined and compared to expected pixel coordinate data extracted from the profile. In still other examples, the check or check image being evaluated may positioned to overlay (or vice versa) a check image from the retrieved profile and edge detection processes may be used to determine anomalies between the edges of the check in the check image being evaluated and the check in the check image from the profile. Various other arrangements for comparing size and/or shape data may be used without departing from the invention.

With reference to FIG. 2C, at step 212, any anomalies in the comparison of size and/or shape data may be identified. For instance, if a pixel location (e.g., based on coordinates) of the check image does not match (e.g., within a threshold amount) coordinates of the corresponding pixel from the check image from the profile, an anomaly may be identified. In another example, if the check image being evaluated overlays the check image from the profile and the edges do not correspond, any anomaly may be identified. In another example, if the overall length or width of the check image being evaluated does not match (e.g., within a threshold amount) the expected length or width from the profile, an anomaly may be identified. Various other methods of identifying anomalies may be used without departing from the invention.

At step 213, the image evaluation and dynamic cropping system may programmatically crop or edit the check image being evaluated based on the identified anomalies. For instance, in some examples, a bounding box may be generated around a portion of the check image (e.g., corresponding to pixels outside of an expected area) and data within the bounding box may be deleted (e.g., by identifying pixel coordinates within the bounding box and deleting the pixels). In another example, if the check image being evaluated overlaps the check image from the profile, pixel coordinates corresponding to pixels outside of an expected area (e.g., outside of an edge of the check image from the profile) may be deleted. In another example, pixel coordinates corresponding to an expected edge of the check being evaluated may be identified and pixels located outside of that edge may be deleted. Various other methods of dynamically cropping the check image may be performed without departing from the invention.

At step 214, an updated or modified check image may be generated based on the cropped check image. At step 215, in some examples, the updated or modified check image may be stored or saved.

At step 216, a connection may be established between the image evaluation and dynamic cropping computing platform 110 and the check receiving and processing computing device 120. For instance, a second wireless connection may be established between the image evaluation and dynamic cropping computing platform 110 and the check receiving and processing computing device 120. Upon establishing the second wireless connection, a communication session may be initiated between the image evaluation and dynamic cropping computing platform 110 and the check receiving and processing computing device 120.

At step 217, the updated or modified check image may be transmitted to the check receiving and processing computing device 120. For instance, the updated or modified check image may be transmitted from the image evaluation and dynamic cropping computing platform 110 to the check receiving and processing computing device 120 during the communication session initiated upon establishing the second wireless connection.

Figure 2D:
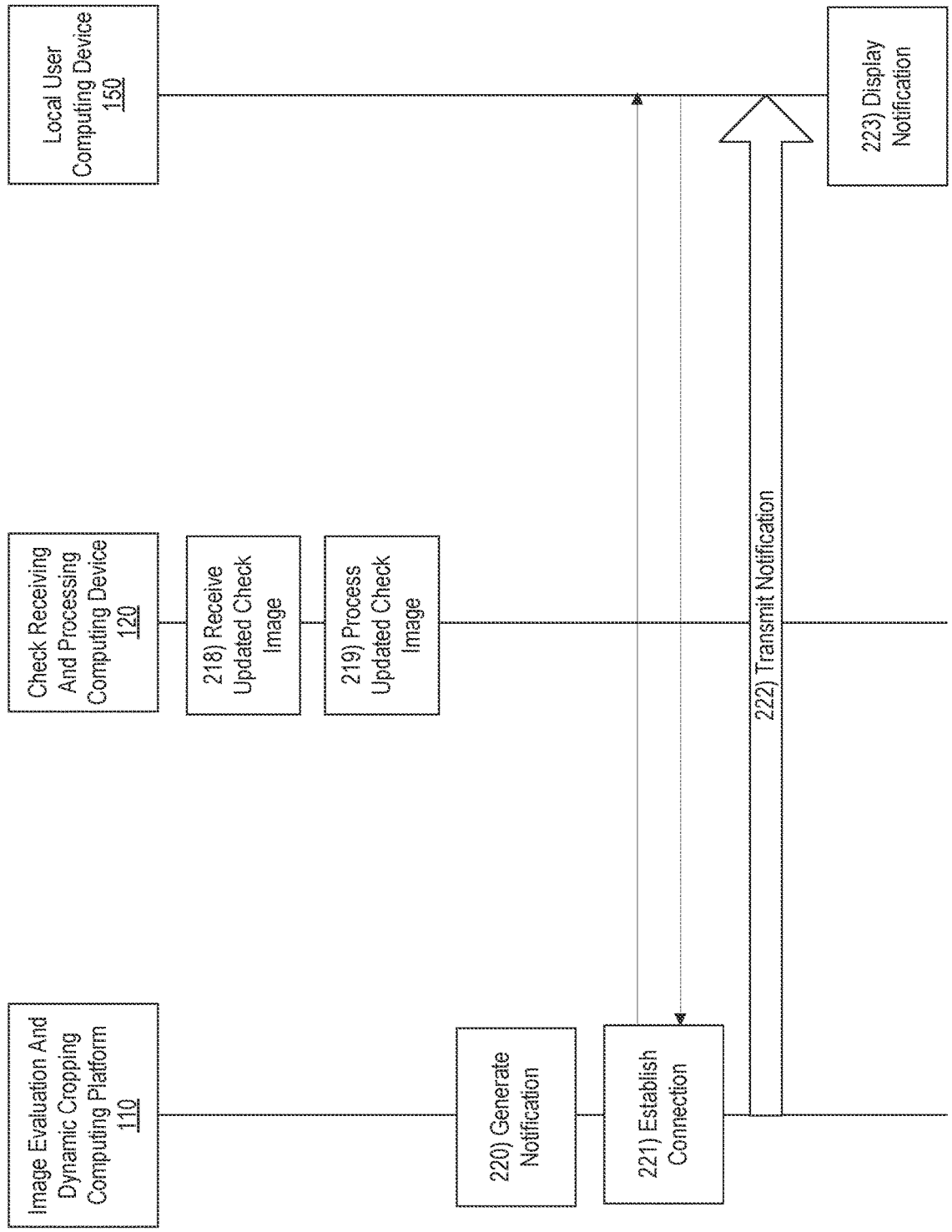

With reference to FIG. 2D, at step 218, the updated or modified check image may be receiving by the check receiving and processing computing device 120. At step 219, the updated or modified check image may be processed to determine validity of the check.

At step 220, a notification may be generated by the image evaluation and dynamic cropping computing platform 110. In some examples, the notification may include an indication that a check image was modified.

At step 221, a connection may be established between the image evaluation and dynamic cropping computing platform 110 and the local user computing device 150. For instance, a third wireless connection may be established between the image evaluation and dynamic cropping computing platform 110 and the local user computing device 150. Upon establishing the third wireless connection, a communication session may be initiated between the image evaluation and dynamic cropping computing platform 110 and the local user computing device 150.

At step 222, the generated notification may be transmitted from the image evaluation and dynamic cropping computing platform 110 to the local user computing device 150 during communication session initiated upon establishing the third wireless communication session.

At step 223, the notification may be received by the local user computing device and displayed on a display of the device.

Figure 3:
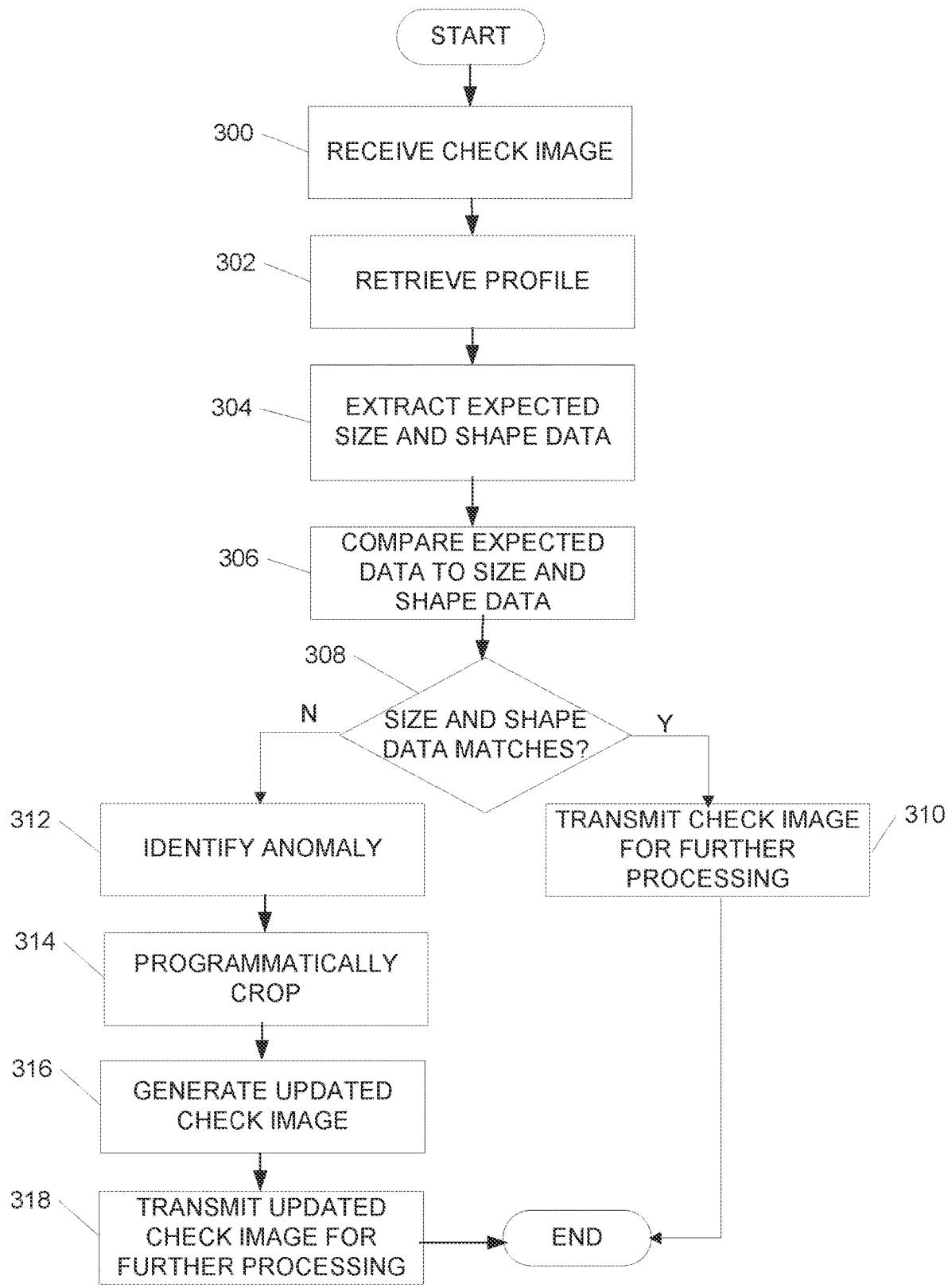
FIG. 3 depicts an illustrative method for implementing and using a system to perform image evaluation and dynamic cropping functions, according to one or more aspects described herein.

FIG. 3 is a flow chart illustrating one example method of providing image evaluation and dynamic cropping functions according to one or more aspects described herein. The processes illustrated in FIG. 3 are merely some example processes and functions. The steps shown may be performed in a different order, more steps may be added, or one or more steps may be omitted without departing from the invention.

At step 300, a check image may be received by the image evaluation and dynamic cropping computing platform 110. In some examples, the check may have been previously processed by the check receiving and processing computing device 120 and a validity may be determined or attempted to be determined. In other examples, the check image may be received from a computing device receiving the check for processing, such as local user computing device 150, remote user computing device 170, or the like.

At step 302, identifying data may be extracted from the check image and used to retrieve a check/check image profile. The check/check image profile may include expected size and/or shape data for a check (e.g., a check associated with this payer).

At step 304, the expected size and/or shape data may be extracted from the retrieved check/check image profile. At step 306, the expected size and/or shape data may be compared to size and/or shape data associated with the check image being evaluated.

At step 308, a determination may be made as to whether the size and/or shape data of the check image being evaluated matches the expected size and/or shape data from the check/check image profile. In some examples, a match may include coordinates of a pixel along an edge of the check image being evaluated corresponding to coordinates of a pixel along an edge of a check image from the profile. In another example, a match may include an overall length and/or width being within a certain threshold of units of the expected overall length and/or width (e.g., within 5 mm, 0.2 inches, or the like).

If, at step 308, the size and/or shape data for the check image being evaluated matches the expected size and/or shape data, the check image may be transmitted for further processing (e.g., validity evaluation, or the like) at step 310.

If, at step 308, the size and/or shape data for the check image being evaluation does not match the expected size and/or shape data, one or more anomalies may be identified in the check image being evaluated at step 312. In some examples, identifying an anomaly may include identifying an edge, portion or region at which the anomaly is located.

At step 314, the check image may be programmatically cropped to remove the identified anomaly. For instance, as discussed, image data extended beyond an expected size and/or shape may be removed, thereby modifying the check image.

At step 316, an updated or modified check image may be generated based on the cropped check image. In some examples, the updated check image may be stored.

At step 318, the updated or modified check image may be transmitted for further processing (e.g., validity evaluation and the like).

Figures 4A, 4B:
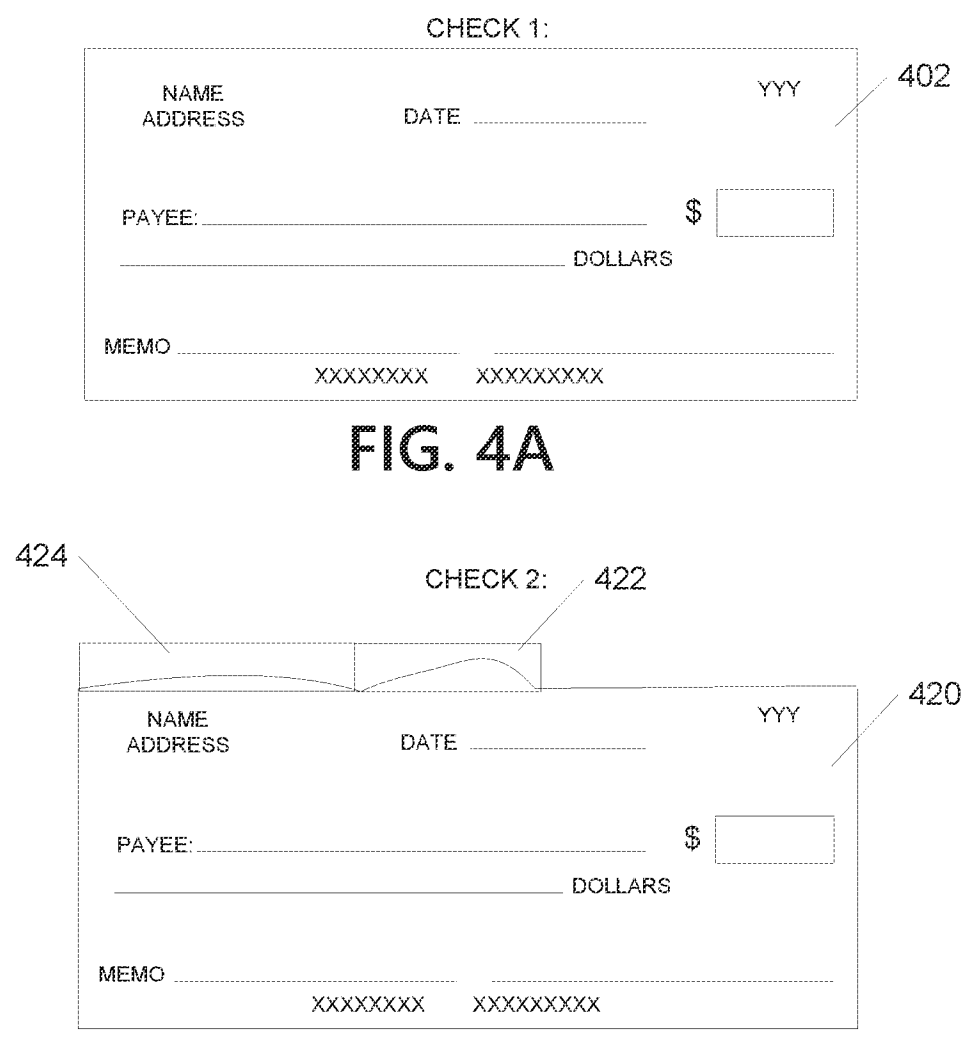

FIGS. 4A and 4B illustrate example check images according to one or more aspects discussed herein. With reference to FIG. 4A, check 1 402 illustrates an example check image that may be retrieved from a check/check image profile. As shown, the check 402 includes smooth or relatively smooth and even edges.

FIG. 4B illustrates one example check image being evaluated by the image evaluation and dynamic cropping system described herein and compared to the check image 402 in FIG. 4A. As shown in FIG. 4B, check 420 includes portions extending beyond an expected edge of the check. The portions are highlighted by regions 422 and 424. In some examples, the regions 422 and 424 may include bounding boxes and any data located within the bounding boxes (e.g., pixels within the boxes) may be deleted. In another example, if check 420 overlays check 402, the overhanging portions may be identified and deleted. Accordingly, the portions of check 420 beyond an expected size and/or shape (e.g., based on check 402 retrieved from check/check image profile) may be deleted, thereby modifying the check image and generated an updated or modified check image having an expected size and/or shape.

Although aspects directed to FIGS. 4A and 4B are described in the context of cropping, editing or modifying a top edge of a document, the arrangements described herein may be used to identify anomalies along any edge or portion of the check or check image and dynamic cropping functions may be performed on any edge or portion of the check or check image.

As discussed herein, aspects described are directed to systems for evaluating a size and/or shape of a check or other document and, if desired, programmatically modifying, editing or cropping an image of the check or other document. As discussed, many checks or other documents (e.g., remittance coupon) are provided to a user via a full page document with only a portion (e.g., less than all of the full page document) including the check or other instrument. When a user attempts to detach the check or other instrument, portions of the check or other instrument may tear or otherwise be removed from the perforation in an uneven or unexpected arrangement, leaving a check having an irregular or unexpected shape and/or size. In some examples, companies or other payers who use this full page/detachable check or other instrument arrangements may include some of the largest volume check writers. For instance, in some examples, some companies or entities may write or distribute over 15,000 checks per day. Accordingly, accurately determining validity and/or authenticity of the check or other instrument is important.

The arrangements described herein provide for arrangements to evaluate the size and/or shape of a check, instrument or other document, or image thereof, to determine whether it matches expected size and/or shape data. If not, the check or check image may be programmatically modified in order to modify the shape of the check or check image to more closely conform to expected size and shape data.

As discussed herein, expected size and/or shape data may be based on a check/check image profile that may be generated for a particular payer. Accordingly, expected size and/or shape data may be customized or determined based on a particular payer, type of mailing, attributes of the check or other document, or the like.

As discussed herein, the check or check image may be evaluated for size and/or shape anomalies prior to evaluating the check or check image for validity or authenticity. In some examples, the check or check image may be evaluated for validity and/or authenticity first and then evaluated for size and/or shape anomalies.

Check or other document images may be received in any suitable document format, such as TIFF, PDF, or JPEG, or the like. In some examples, the document may be received and processed in the file format in which it was received. In other examples, the check image may be converted to another file format prior to processing. In some arrangements, the check image may be processed in the format in which it was received and, after processing and/or cropping, the updated or modified check image may be converted to another file format for further processing and/or to comply with one or more standards (e.g., business standards, government standards, regulatory standards, or the like. Additionally or alternatively, a resolution of the image may be modified either prior to evaluation for size and/or shape anomalies and/or after evaluation for size and/or shape anomalies.

The above-described examples and arrangements are merely some example arrangements in which the systems described herein may be used. Various other arrangements employing aspects described herein may be used without departing from the invention.

Figure 5:
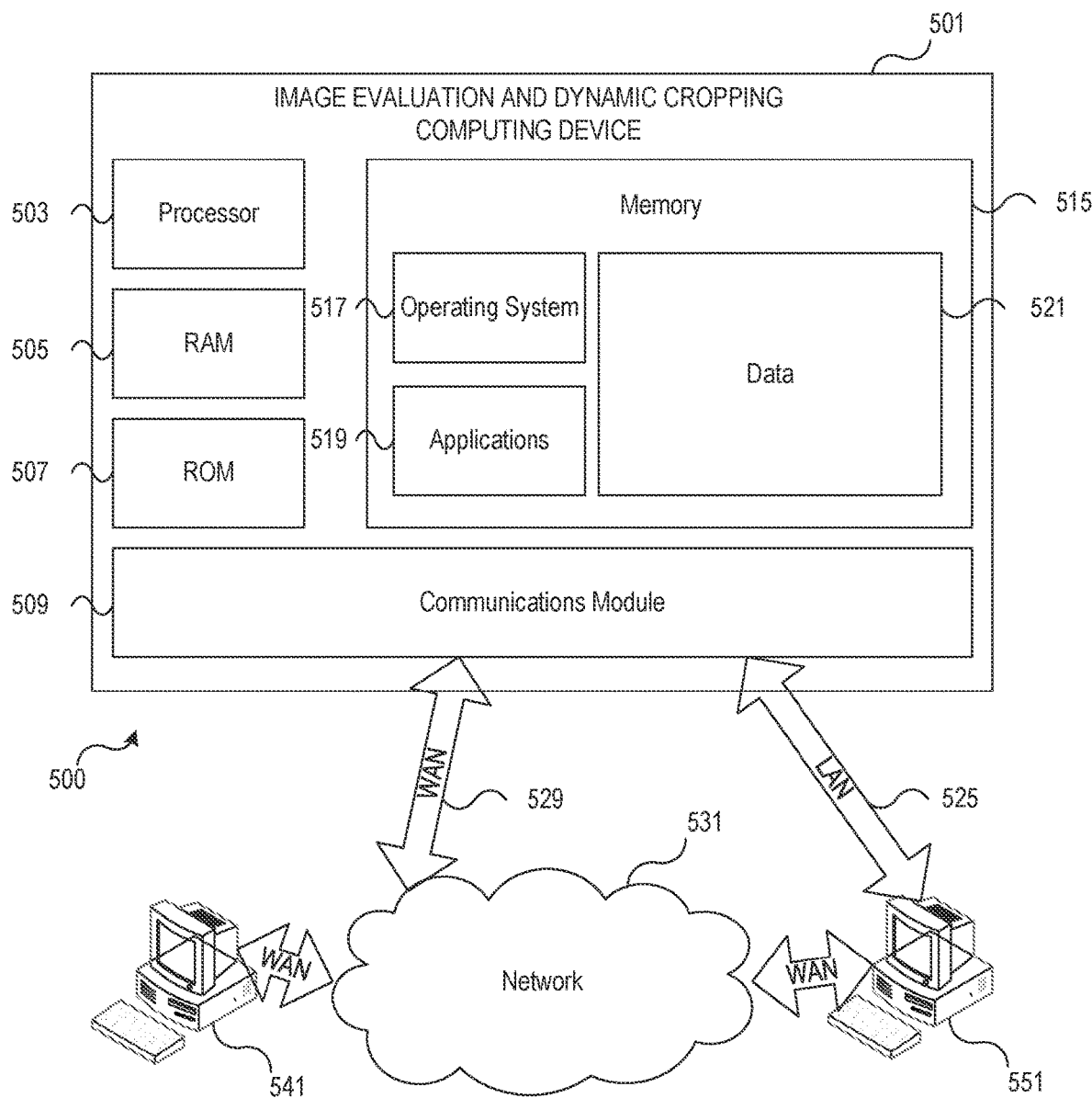
FIG. 5 illustrates one example operating environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include image evaluation and dynamic cropping computing device 501 having processor 503 for controlling overall operation of image evaluation and dynamic cropping computing device 501 and its associated components, including Random Access Memory (RAM) 505, Read-Only Memory (ROM) 507, communications module 509, and memory 515. Image evaluation and dynamic cropping computing device 501 may include a variety of computer readable media. Computer readable media may be any available media that may be accessed by image evaluation and dynamic cropping computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on image evaluation and dynamic cropping computing device 501. Such a processor may execute computer-executable instructions stored on a computer-readable medium.

Software may be stored within memory 515 and/or storage to provide instructions to processor 503 for enabling image evaluation and dynamic cropping computing device 501 to perform various functions as discussed herein. For example, memory 515 may store software used by image evaluation and dynamic cropping computing device 501, such as operating system 517, application programs 519, and associated database 521. Also, some or all of the computer executable instructions for image evaluation and dynamic cropping computing device 501 may be embodied in hardware or firmware. Although not shown, RAM 505 may include one or more applications representing the application data stored in RAM 505 while image evaluation and dynamic cropping computing device 501 is on and corresponding software applications (e.g., software tasks) are running on image evaluation and dynamic cropping computing device 501.

Communications module 509 may include a microphone, keypad, touch screen, and/or stylus through which a user of image evaluation and dynamic cropping computing device 501 may provide input, and may also include one or more of a speaker for providing audio output and a video display device for providing textual, audiovisual and/or graphical output. Computing system environment 500 may also include optical scanners (not shown).

Image evaluation and dynamic cropping computing device 501 may operate in a networked environment supporting connections to one or more remote computing devices, such as computing devices 541 and 551. Computing devices 541 and 551 may be personal computing devices or servers that include any or all of the elements described above relative to image evaluation and dynamic cropping computing device 501.

The network connections depicted in FIG. 5 may include Local Area Network (LAN) 525 and Wide Area Network (WAN) 529, as well as other networks. When used in a LAN networking environment, image evaluation and dynamic cropping computing device 501 may be connected to LAN 525 through a network interface or adapter in communications module 509. When used in a WAN networking environment, image evaluation and dynamic cropping computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
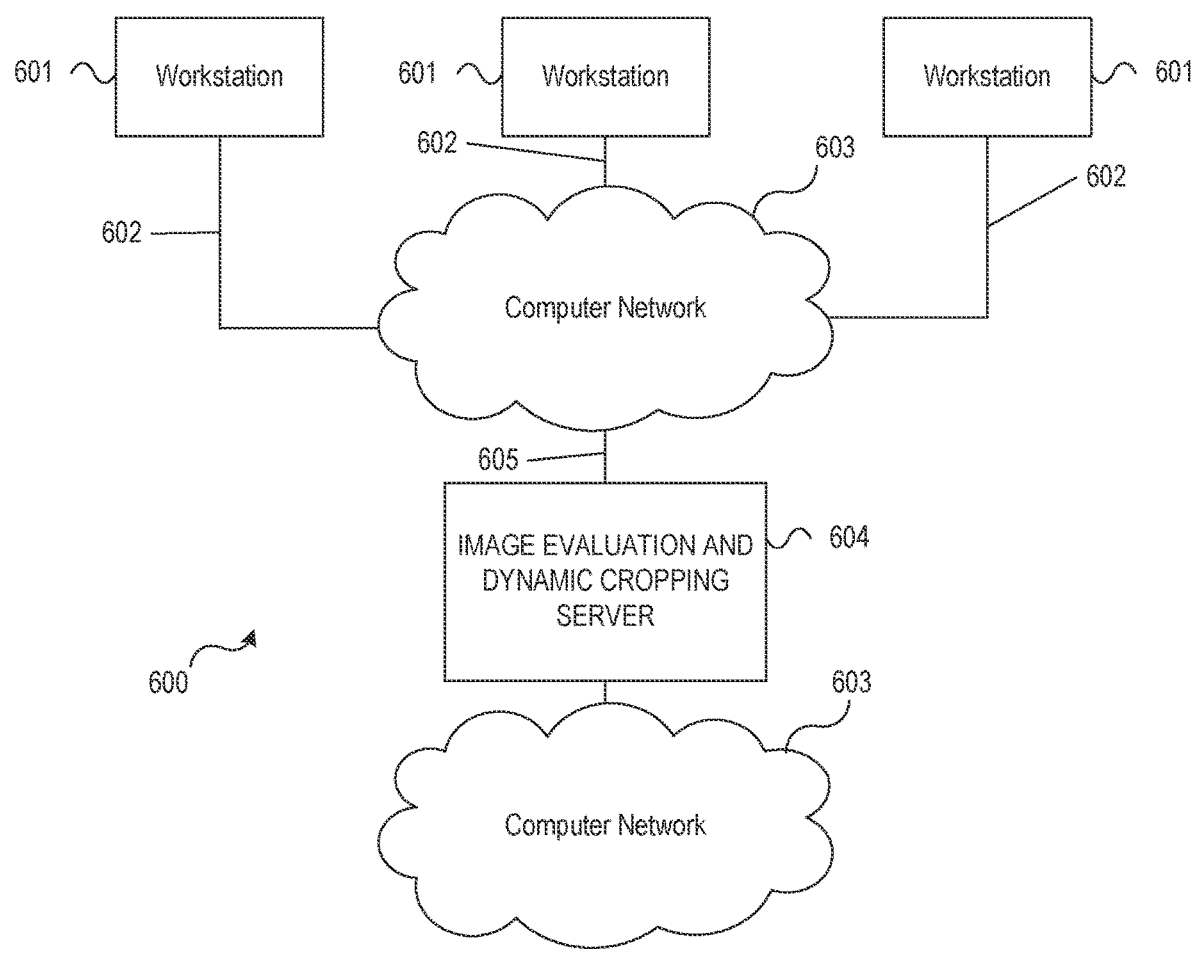
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to image evaluation and dynamic cropping server 604. In system 600, image evaluation and dynamic cropping server 604 may be a server, processor, computer, or data processing device, or combination of the same, configured to perform the functions and/or processes described herein. Server 604 may be used to receive check images, extract data from check images, retrieve a check/check image profile, compare check images from the profile to the received check image, detect anomalies in the received check image, programmatically crop or modify the received check image, generate an updated check image, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and image evaluation and dynamic cropping server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   extract, from an image of a document, identifying information;
   identify expected data of the document;
   compare data of the document in the image of the document to the expected data of the document;
   determine, based on the comparing, whether an anomaly exists between the data of the document in the image and the expected data of the document;
   responsive to determining that an anomaly does not exist, evaluate validity of the document based on the image of the document; and
   responsive to determining that an anomaly exists:
   programmatically modify, based on one or more machine learning datasets, the image of the document;
   generate a modified image of the document based on the programmatically modified image of the document; and
   evaluate validity of the document based on the modified image of the document.

2. The computing platform of claim 1, wherein programmatically modifying the image of the document includes programmatically cropping the image of the document.

3. The computing platform of claim 2, wherein programmatically cropping the image of the document includes identifying, based on the one or more machine learning datasets, an amount of image data to remove by cropping.

4. The computing platform of claim 1, wherein programmatically modifying, based on one or more machine learning datasets, the image of the document includes identifying, based on the one or more machine learning datasets, a portion of the document to programmatically modify.

5. The computing platform of claim 1, wherein comparing the data of the document in the image of the document to the expected data of the document further includes:
   identifying pixel coordinates corresponding to an edge of the document in the image of the document; and
   comparing the identified pixel coordinates to corresponding pixel coordinates in the expected data of the document.

6. The computing platform of claim 1, wherein programmatically modifying the image of the document further includes:
   generating a bounding box around a region of the image of the document corresponding to the anomaly; and
   deleting data within the bounding box.

7. The computing platform of claim 1, wherein programmatically modifying the image of the document further includes:
   identifying pixel coordinates corresponding to a region of the image of the document that includes the anomaly; and
   deleting pixels associated with the identified pixel coordinates.

8. A method, comprising:
   at a computing platform comprising at least one processor, memory, and a communication interface:
   extracting, by the at least one processor and from an image of a document, identifying information;
   identifying, by the at least one processor, expected data of the document;
   comparing, by the at least one processor, data of the document in the image of the document to the expected data of the document;
   determining, by the at least one processor and based on the comparing, whether an anomaly exists between the data of the document in the image and the expected data of the document;
   responsive to determining that an anomaly does not exist, evaluate validity of the document based on the image of the document; and
   responsive to determining that an anomaly exists:
   programmatically modifying, based on one or more machine learning datasets and by the at least one processor, the image of the document;
   generating, by the at least one processor, a modified image of the document based on the programmatically modified image of the document; and
   evaluating, by the at least one processor, validity of the document based on the modified image of the document.

9. The method of claim 8, wherein programmatically modifying the image of the document includes programmatically cropping the image of the document.

10. The method of claim 9, wherein programmatically cropping the image of the document includes identifying, based on the one or more machine learning datasets, an amount of image data to remove by cropping.

11. The method of claim 8, wherein programmatically modifying, based on one or more machine learning datasets, the image of the document includes identifying, based on the one or more machine learning datasets, a portion of the document to programmatically modify.

12. The method of claim 8, wherein comparing, by the at least one processor, the data of the document in the image of the document to the expected data of the document further includes:
   identifying, by the at least one processor, pixel coordinates corresponding to an edge of the document in the image of the document; and
   comparing, by the at least one processor, the identified pixel coordinates to corresponding pixel coordinates in the expected data of the document.

13. The method of claim 8, wherein programmatically modifying the image of the document further includes:
   generating, by the at least one processor, a bounding box around a region of the image of the document corresponding to the anomaly; and
   deleting, by the at least one processor, data within the bounding box.

14. The method of claim 8, wherein programmatically modifying the image of the document further includes:
   identifying, by the at least one processor, pixel coordinates corresponding to a region of the image of the document that includes the anomaly; and
   deleting, by the at least one processor, pixels associated with the identified pixel coordinates.

15. One or more non-transitory computer-readable media storing instructions that, when executed by a computing platform comprising at least one processor, memory, and a communication interface, cause the computing platform to:
   extract, from an image of a document, identifying information;
   identify expected data of the document;
   compare data of the document in the image of the document to the expected data of the document;
   determine, based on the comparing, whether an anomaly exists between the data of the document in the image and the expected data of the document;
   responsive to determining that an anomaly does not exists, evaluate validity of the document based on the image of the document; and
   responsive to determining that an anomaly exists:
      programmatically modify, based on one or more machine learning datasets, the image of the document;
      generate a modified image of the document based on the programmatically modified image of the document; and
      evaluate validity of the document based on the modified image of the document.

16. The one or more non-transitory computer-readable media of claim 15, wherein programmatically modifying the image of the document includes programmatically cropping the image of the document.

17. The one or more non-transitory computer-readable media of claim 16, wherein programmatically cropping the image of the document includes identifying, based on the one or more machine learning datasets, an amount of image data to remove by cropping.

18. The one or more non-transitory computer-readable media of claim 15, wherein programmatically modifying, based on one or more machine learning datasets, the image of the document includes identifying, based on the one or more machine learning datasets, a portion of the document to programmatically modify.

19. The one or more non-transitory computer-readable media of claim 15, wherein comparing the data of the document in the image of the document to the expected data of the document further includes:
   identifying pixel coordinates corresponding to an edge of the document in the image of the document; and
   comparing the identified pixel coordinates to corresponding pixel coordinates in the expected data of the document.

20. The one or more non-transitory computer-readable media of claim 15, wherein programmatically modifying the image of the document further includes:
   generating a bounding box around a region of the image of the document corresponding to the anomaly; and
   deleting data within the bounding box.

21. The one or more non-transitory computer-readable media of claim 15, wherein programmatically modifying the image of the document further includes:
   identifying pixel coordinates corresponding to a region of the image of the document that includes the anomaly; and
   deleting pixels associated with the identified pixel coordinates.

* * * * *